United States Patent [19]

Dumbaugh, Jr. et al.

[11] Patent Number: 5,326,730
[45] Date of Patent: Jul. 5, 1994

[54] BARIUM ALUMINOSILICATE GLASSES

[75] Inventors: William H. Dumbaugh, Jr., Painted Post; Josef C. Lapp, Corning, both of N.Y.

[73] Assignee: Corning Incorporated, Corning, N.Y.

[21] Appl. No.: 61,459

[22] Filed: May 17, 1993

Related U.S. Application Data

[63] Continuation-in-part of Ser. No. 8,561, Jan. 22, 1993, abandoned.

[51] Int. Cl.$^5$ .................. C03C 3/085; C03C 3/097; C03C 3/078; C03C 3/091
[52] U.S. Cl. ........................... 501/69; 501/63; 501/66; 501/67; 359/82
[58] Field of Search .................. 501/69, 63, 66, 67; 359/82

[56] References Cited

U.S. PATENT DOCUMENTS

| | | | |
|---|---|---|---|
| 3,305,371 | 2/1967 | de Lajarte | 501/69 X |
| 3,338,696 | 8/1967 | Dockerty | 65/145 |
| 3,682,609 | 8/1972 | Dockerty | 65/82 |
| 3,942,992 | 3/1976 | Flannery | 501/69 |
| 4,409,337 | 10/1983 | Dumbaugh | 501/66 |
| 4,737,685 | 4/1988 | Thomas | 501/67 X |
| 4,824,808 | 4/1989 | Dumbaugh | 501/66 |
| 4,994,415 | 2/1991 | Imai | 501/66 |
| 5,116,787 | 5/1992 | Dumbaugh | 501/66 |
| 5,116,788 | 5/1992 | Dumbaugh | 501/66 |

FOREIGN PATENT DOCUMENTS

1143702  3/1985  U.S.S.R. .................. 501/69

Primary Examiner—Anthony Green
Assistant Examiner—David Sample
Attorney, Agent, or Firm—C. S. Janes, Jr.

[57] ABSTRACT

This invention is directed to glass compositions particularly designed for use as substrates in flat panel display devices and, more expressly, for use as substrates in LCDs which employ polycrystalline silicon thin film transistors. The glass compositions are essentially free from alkali metal oxides and consist essentially, in mole percent, of

| | | | | | | |
|---|---|---|---|---|---|---|
| $SiO_2$ | 65-76 | MgO | 0-5 | $ZrO_2$ | 0-2.5 |
| $Al_2O_3$ | 7-11 | CaO | 0-10 | $TiO_2$ | 0-3 |
| BaO | 12-19 | SrO | 0-10 | $Ta_2O_5$ | 0-3 |
| $B_2O_3$ | 0-5 | MgO + CaO + SrO | 0-15 | $ZrO_2 + TiO_2 + Ta_2O_5$ | 0.5-5. |

4 Claims, No Drawings

BARIUM ALUMINOSILICATE GLASSES

This application is a continuation-in-part of U.S. application Ser. No. 08/008,561, filed Jan. 22, 1993 and now abandoned.

RELATED APPLICATION

U.S. application Ser. No. 08/008,560, filed concurrently by us with the predecessor of this application, viz., Ser. No. 08/008,561, under the title HIGH LIQUIDUS VISCOSITY GLASSES FOR FLAT PANEL DISPLAYS, is directed to glasses particularly designed for use as substrates in flat panel display devices. Those glasses exhibit strain points higher than 650° C., liquidus temperatures no higher than 1,125° C., viscosities at the liquidus temperature greater than 600,000 poises (60,000 Pa·s), weight losses of less than 2 mg/cm$^2$ after immersion for 24 hours in an aqueous 5% by weight HCl solution at 95° C., and melting viscosities of about 200 poises (20 Pa·s) at a temperature below 1,675° C., the glasses being essentially free from alkali metal oxides and consisting essentially, expressed in terms of mole percent on the oxide basis, of

| | | | |
|---|---|---|---|
| $SiO_2$ | 64–70 | MgO | 0–5 |
| $Al_2O_3$ | 9.5–12 | CaO | 3–13 |
| $B_2O_3$ | 5–10 | SrO | 0–5.5 |
| $TiO_2$ | 0–5 | BaO | 2–5.5 |
| $Ta_2O_5$ | 0–5 | MgO + CaO + SrO + BaO | 10–20. |

FIELD OF THE INVENTION

This invention is directed to the production of glass compositions exhibiting such properties as high strain points, high viscosities at their liquidus temperature, and long term stability against devitrification at processing temperatures, coupled with a temperature capability and chemical durability necessary to withstand liquid crystal display manufacture, thereby rendering them eminently suitable for use as substrates for liquid crystal display (LCD) devices which employ polysilicon (poly-Si) thin film transistors (TFTs) as switches.

BACKGROUND OF THE INVENTION

Liquid crystal displays (LCDs) are passive displays which depend upon external sources of light for illumination. They are manufactured as segmented displays or in one of two basic configurations. The substrate needs (other than being transparent and capable of withstanding the chemical conditions to which it is exposed during display processing) of the two matrix types vary. The first type is intrinsic matrix addressed, relying upon the threshold properties of the liquid crystal material. The second is extrinsic matrix or active matrix (AM) addressed, in which an array of diodes, metal-insulator-metal (MIM) devices, or thin film transistors (TFTs) supplies an electronic switch to each pixel. In both cases, two sheets of glass form the structure of the display. The separation between the two sheets is the critical gap dimension, of the order of 5–10 μm.

Intrinsically addressed LCDs are fabricated using thin film deposition techniques at temperatures ≦350° C., followed by photolithographic patterning. As a result, the substrate requirements therefor are often the same as those for segmented displays. Soda-lime-silica glass with a barrier layer has proven to be adequate for most needs. A high performance version of intrinsically addressed LCDs, the super twisted nematic (STN) type, has an added requirement of extremely precise flatness for the purpose of holding the gap dimensions uniform. Because of that requirement, soda-lime-silica glass used for those displays must be polished or, alternatively, a precision formed, barium aluminoborosilicate glass marketed by Corning Incorporated, Corning, N.Y., as Code 7059 may be used without polishing.

Extrinsically addressed LCDs can be further subdivided into two categories; viz., one based on MIM or amorphous silicon (a-Si) devices, and the other based on polycrystalline silicon (poly-Si) devices. The substrate requirements of the MIM or a-Si type are similar to the STN application. Corning Code 7059 sheet glass is the preferred substrate because of its very low sodium content, i.e., less than 0.1% $Na_2O$ by weight, its dimensional precision, and its commercial availability. Devices formed from poly-Si, however, are processed at higher temperatures than those that are employed with a-Si TFTs. Substrates capable of use temperatures (taken to be 25° C. below the strain point of the glass) of 600°–800° C. are demanded. The actual temperature required is mandated by the particular process utilized in fabricating the TFTs. Those TFTs with deposited gate dielectrics require 600°–650° C., while those with thermal oxides call for about 800° C. Both a-Si and poly-Si processes demand precise alignment of successive photolithographic patterns, thereby necessitating that the thermal shrinkage of the substrate be kept low. Those temperatures have mandated the use of glasses exhibiting higher strain points than soda-lime-silica glass and Corning Code 7059 glass in order to avoid thermal deformation of the sheet during processing. As can be appreciated, the lower the strain point, the greater this dimensional change. Thus, there has been considerable research to develop glasses demonstrating high strain points so that thermal deformation is minimized during device processing at temperatures greater than 600° C., and preferably, higher than 650° C.

U.S. Pat. No. 4,824,808 (Dumbaugh, Jr.) lists four properties which have been deemed mandatory for a glass to exhibit in order to fully satisfy the needs of a substrate for LCDs:

First, the glass must be essentially free of intentionally added alkali metal oxide to avoid the possibility that alkali metal from the substrate can migrate into the transistor matrix;

Second, the glass substrate must be sufficiently chemically durable to withstand the reagents used in the TFT matrix deposition process;

Third, the expansion mismatch between the glass and the silicon present in the TFT array must be maintained at a relatively low level even as processing temperatures for the substrates increase; and Fourth, the glass must be capable of being produced in high quality thin sheet form at low cost; that is, it must not require extensive grinding and polishing to secure the necessary surface finish.

That last requirement is most difficult to achieve inasmuch as it demands a sheet glass production process capable of producing essentially finished glass sheet, such as the overflow downdraw sheet manufacturing process described in U.S. Pat. No. 3,338,696 (Dockerty) and U.S. Pat. No. 3,682,609 (Dockerty). That process requires a glass exhibiting a very high viscosity at the liquidus temperature plus long term stability, e.g., periods of 30 days, against devitrification at melting and forming temperatures.

Corning Code 7059 glass, supra, is currently employed in the fabrication of LCDs. That glass, consisting essentially, in weight percent, of about 50% $SiO_2$, 15% $B_2O_3$, 10% $Al_2O_3$, and 24% BaO, is nominally free of alkali metal oxides, and exhibits a linear coefficient of thermal expansion (25°–300° C.) of about $46 \times 10^{-7}$/° C. and a viscosity at the liquidus temperature in excess of 600,000 poises ($6 \times 10^{-4}$ Pa·s). The high liquidus viscosity of the glass enables it to be drawn into sheet via the overflow downdraw sheet processing technique, but its relatively low strain point (~593° C.) is adequate only for processing a-Si devices and not for poly-Si devices.

The glasses of U.S. Pat. No. 4,824,808, supra, were designed to meet the requirements for use in fabricating poly-Si devices, including the capability of being formed into sheet by the overflow downdraw sheet processing technique, and linear coefficients of thermal expansion as low as about $36.5 \times 10^{-7}$/° C. (25°–300° C.), such as to closely match that of silicon, thereby enabling a silicon chip to De sealed directly thereon, but their strain points were less than 650° C.

The glasses of U.S. Pat. No. 4,409,337 (Dumbaugh, Jr.) were also considered for LCD substrates, but their long term stability against devitrification was feared to be insufficient for their use in the overflow downdraw sheet processing technique.

The glasses of U.S. Pat. No. 5,116,787 (Dumbaugh, Jr.) are essentially free from alkali metal oxides and MgO and demonstrate strain points of 655° C. and higher, with viscosities at the liquidus greater than $1.5 \times 10^5$ poises ($1.5 \times 10^4$ Pa·s). Although designed for use in the overflow downdraw sheet processing technique, their long term stability against devitrification was found to be marginal when employed in the process, some crystallization being formed in the glass during manufacture.

U.S. Pat. No. 5,116,788 (Dumbaugh, Jr.) discloses other glasses exhibiting high strain points, i.e., greater than 675° C., but having such relatively low viscosities at the liquidus temperature, viz., 20,000–200,000 poises (2,000–20,000 Pa·s), as to be subject to devitrification when formed utilizing the overflow downdraw sheet processing technique.

SUMMARY OF THE INVENTION

The present invention arose from the discovery of glasses in the barium aluminosilicate composition system which exhibit strain points higher than 660° C., liquidus temperatures no higher than 1,175° C., exceptionally good chemical durability, exhibiting weight losses of less than 0.5 mg/cm² after immersion for 24 hours in an aqueous 5% by weight HCl solution at 95° C., and long term stability against devitrification at melting and forming temperatures. The glass compositions are essentially free from alkali metal oxides and consist essentially, expressed in terms of mole percent on the oxide basis, of

| $SiO_2$ | 65–76 | SrO | 0–10 |
| $Al_2O_3$ | 7–11 | MgO + CaO + SrO | 0–15 |
| BaO | 12–19 | $ZrO_2$ | 0–2.5 |
| $B_2O_5$ | 0–5 | $TiO_2$ | 0–3 |
| MgO | 0–5 | $Ta_2O_5$ | 0–3 |
| CaO | 0–10 | $ZrO_2 + TiO_2 + Ta_2O_5$ | 0.5–5. |

Compliance with those specified composition intervals has been found necessary in order to obtain glasses illustrating the desired matrix of chemical, forming, and physical properties, as is demonstrated below.

Thus, where the $SiO_2$ concentration is below 65%, the strain point will fall below 660° C. and the resistance of the glass to attack by acid suffers. Conversely, when the content of $SiO_2$ is greater than 76%, melting of the glass becomes difficult at customary glass melting temperatures.

The presence of $Al_2O_3$ plays a vital role in controlling the temperature of the liquidus. Hence, $Al_2O_3$ contents outside of the designated 7–11% interval cause the liquidus temperature to rise to high levels.

The high concentrations of BaO are required to assure the demanded low liquidus temperature. Nevertheless, Levels in excess of 19% can lead to liquidus temperatures higher than desired.

$B_2O_3$ is advantageous in lowering the high temperature melting viscosity of the glass, thereby facilitating melting. It also reduces the strain point of the glass so that additions thereof will be limited to a maximum of about 5%.

The other alkaline earth metal oxides can be useful in modifying the melting and physical properties of the glasses. A substitution of CaO and/or SrO for a portion of the BaO serves to reduce the linear coefficient of thermal expansion of the glass and, in some instances, raise the strain point thereof; but, however, it also raises the liquidus temperature. MgO appears to reduce the liquidus temperature of the glasses when included in amounts less than about 5% but at greater levels the liquidus temperature appears to rise. In general, the total MgO+CaO+SrO will not exceed about 15%, with CaO and SrO being useful in concentrations up to 10% each.

We have found several unexpected benefits through additions of as little as 0.5% of $Ta_2O_5$, $TiO_2$, and/or $ZrO_2$. That is, the inclusion of $Ta_2O_5$ at levels up to about B% raises the strain point of the glasses significantly, while lowering their linear coefficient of thermal expansion, without substantially affecting the liquidus temperature thereof. $ZrO_2$ behaves in a similar manner at concentrations up to about 2.5%. At levels above that amount, however, the liquidus temperature rises steeply. $TiO_2$ contents up to about 3% appear to raise the strain point of the glasses slightly and are quite effective in reducing the thermal expansion thereof. The sum of $ZrO_2 + TiO_2 + Ta_2O_5$ will total about 5%, with a minimum level of about 0.5% assuring a substantial effect upon the strain point and linear coefficient of thermal expansion of the glass.

The preferred glasses have compositions consisting essentially, expressed in terms of mole percent on the oxide basis, of about

| $SiO_2$ | 68–76 | $ZrO_2$ | 0–2 |
| $Al_2O_3$ | 7–10 | $TiO_2$ | 0–2.5 |
| BaO | 14–19 | $Ta_2O_5$ | 0–2.5 |
| $B_2O_3$ | 0–5 | $ZrO_2 + TiO_2 + Ta_2O_5$ | 0.5–5. |

PRIOR ART

U.S. Pat. No. 5,116,789 (Dumbaugh, Jr. et al.) is drawn to strontium aluminosilicate glasses especially designed for use as substrates for LCD devices which utilize poly-Si TFTs. The compositions of the glasses are essentially free from alkali metal oxides and MgO and consist essentially, in mole percent on the oxide basis, of

| SiO$_2$ | 65–75 | CaO and/or BaO | 0–10 |
| --- | --- | --- | --- |
| Al$_2$O$_3$ | 6–10 | B$_2$O$_3$ | 0–5 |
| SrO | 15–26 | (CaO and/or BaO) + B$_2$O$_3$ | 0–12 |

Not only are those compositions high in SrO and low in BaO compared to the glasses of the present invention, but also there is no recognition therein of the very beneficial effects resulting from additions of Ta$_2$O$_5$, TiO$_2$, and/or ZrO$_2$.

U.S. Pat. No. 5,116,789 (Shell) discloses glass compositions essentially free from alkali metal oxides especially designed for the encapsulation and sealing of electronic equipment and for the formation of a variety of containers where superior chemical durability and high electrical necessity are desired. The glasses consisted essentially, expressed in terms of mole percent on the oxide basis, of

| SiO$_2$ | 64–75.9 | BaO | 7–16.4 |
| --- | --- | --- | --- |
| Al$_2$O$_3$ | 6–9.1 | MgO | 0–4 |
| CaO | 0–26 | CaO + BaO + MgO | $\geq 16.4$ |

Ta$_2$O$_5$, TiO$_2$ and ZrO$_2$ are nowhere mentioned in the patent so there is no appreciation of the capability of those materials in raising the strain point of the base BaO.Al$_2$O$_3$.SiO$_2$ glass while reducing the linear coefficient of thermal expansion.

DESCRIPTION OF PREFERRED EMBODIMENTS

Table I reports a number of glass compositions, expressed in terms of parts by weight on the oxide basis, illustrating the compositional parameters of the present inventive glasses. Inasmuch as the sum of the individual components totals or very closely approximates 100, for all practical purposes the listed values may be considered to reflect weight percent. The actual batch materials may comprise any materials, either an oxide or other compound, which, when melted together with the other batch constituents, will be converted into the desired oxide in the proper proportions. For example, CaCO$_3$ and BaCO$_3$ can supply the source of CaO and BaO, respectively.

The batch ingredients were compounded, tumble mixed together thoroughly to assist in obtaining a homogeneous melt, and charged into platinum crucibles. After placing lids thereon, the crucibles were introduced into furnaces operating at temperatures of 1,600° C. To assure the formation of inclusion- and cord-free glasses, a two-step melting practice was undertaken. In the first step the batch was melted for about 16 hours, stirred, and thereafter poured as a fine stream into a bath of tap water to form finely-divided particles of glass, a process termed "drigaging" in the glass art. In the second step the finely-divided glass particles (after drying) were remelted at 1,600° C. for about four hours, the melts stirred in both directions, i.e., both clockwise and counterclockwise, and the melts then poured onto steel plates to make glass slabs having the approximate dimensions 18"×6"×0.5" (~45.7×15.2×1.3 cm), and those slabs transferred immediately to an annealer operating at about 750° C.

It must be recognized that the above description reflects a laboratory melting procedure only. Thus, the inventive glasses are quite capable of being melted and formed utilizing large scale, commercial glass melting and forming equipment. Where desired, fining agents such as the oxides of arsenic and antimony may be added in customary amounts. The small residual remaining in the glass has no substantial effect upon the properties of the glass.

The compositions of four glasses commercially available from Corning Incorporated are also recorded in Table I, as analyzed in weight percent, for comparison purposes. Code 7059 has been discussed above. Code 1724, Code 1733, and Code 1735 glasses are included within U.S. Pat. No. 4,409,337, U.S. Pat. No. 4,804,808, and U.S. Pat. No. 5,116,787, respectively, which patents were reviewed briefly above.

Table I also recites measurements of several chemical and physical properties determined on the glasses in accordance with measuring techniques conventional in the glass art. Hence, the linear coefficient of thermal expansion (Exp) over the temperature range 0°–300° C. expressed in terms of $\times 10^{-7}$/° C., and the softening point (S.P.), the annealing point (A.P.), and the strain point (St.P.) expressed in terms of °C., were determined via fiber elongation. The durability (Dur) in HCl was evaluated by determining the weight loss (mg/cm$^2$) after immersion in a bath of aqueous 5% by weight HCl operating at 95° C. for 24 hours.

The liquidus temperatures of the glasses were measured via two different methods. The standard liquidus method (Liq.) involves placing crushed glass particles in a platinum boat, placing the boat in a furnace having a region of gradient temperatures, heating the boat in an appropriate temperature region for 24 hours to melt the glass in at least a section of the boat length, withdrawing the boat from the furnace, allowing the melt to cool in the boat to a length of glass, removing said length of glass from the boat, and determining by means of microscopic examination the highest temperature at which crystals appear in the interior of the glass. A second method termed the "meltback liquidus" (M.Liq.) contemplates placing a glass sample which has been precrystallized by holding at a temperature of 1,000° C. for 24 hours in a platinum boat, heating the boat in an appropriate temperature region in a gradient furnace for 24 hours, withdrawing the boat from the furnace, removing the glass sample from the boat, and then determining by microscopic examination the lowest temperature at which crystals are not observed in the interior of the glass. Generally, the Liquidus temperatures measured by these two techniques do not differ by more than 50° C., with the "meltback liquidus" typically being higher than the standard liquidus temperature.

Table IA records the same glass compositions but reported in terms of mole percent on the oxide basis.

TABLE I

|  | 7059 | 1724 | 1733 | 1735 | 1 |
| --- | --- | --- | --- | --- | --- |
| SiO$_2$ | 50 | 56.8 | 57.0 | 57.1 | 53.0 |
| Al$_2$O$_3$ | 10 | 16.4 | 15.2 | 14.5 | 9.1 |
| B$_2$O$_3$ | 15 | 4.7 | 12.4 | 4.7 | 1.7 |
| MgO | — | 5.8 | 1.4 | — | — |
| CaO | — | 7.8 | 3.9 | 11.1 | — |
| SrO | — | — | 3.6 | — | 0.6* |
| BaO | 25 | 8.0 | 52 | 12.5 | 33.8 |
| Exp. | 46 | 43.5 | 36.5 | 48.8 | 55.2 |
| S.P. | 844 | 920 | 918 | 924 | 914 |
| A.P. | 639 | 720 | 695 | 717 | 707 |
| St.P. | 593 | 675 | 640 | 671 | 660 |

TABLE I-continued

| | | | | | |
|---|---|---|---|---|---|
| Dur. | 12 | 0.3 | 4 | 0.1 | 0.04 |
| Liq. | 960 | 1100 | 980 | 1055 | — |
| M.Liq. | 955 | — | 1035 | 1090 | 1090 |

| | 2 | 3 | 4 | 5 | 6 |
|---|---|---|---|---|---|
| $SiO_2$ | 60.5 | 53.2 | 56.7 | 52.6 | 52.2 |
| $Al_2O_3$ | 11.0 | 9.2 | 10.3 | 9.1 | 9.0 |
| $B_2O_3$ | — | — | 3.4 | 3.3 | 3.3 |
| SrO | 0.5* | 0.6* | 0.4* | 0.5* | 0.5* |
| BaO | 27.8 | 33.9 | 26.0 | 33.6 | 33.6 |
| $ZrO_2$ | — | 3.0 | 3.0 | 0.8 | 1.5 |
| Exp. | 47.0 | 53.7 | 45.5 | 54.4 | 53.9 |
| S.P. | 1054 | 1000 | 1008 | 921 | 928 |
| A.P. | 793 | 781 | 760 | 712 | 717 |
| St.P. | 730 | 724 | 704 | 664 | 669 |
| Dur. | — | 0.04 | 0.03 | 0.02 | 0.02 |
| M.Liq. | 1200 | 1100 | 1100 | 1090 | 1075 |

| | 7 | 8 | 9 | 10 |
|---|---|---|---|---|
| $SiO_2$ | 51.5 | 50.6 | 52.5 | 48.1 |
| $Al_2O_3$ | 8.9 | 8.7 | 9.0 | 8.3 |
| $B_2O_3$ | 3.2 | 3.2 | 3.3 | 3.0 |
| SrO | 0.5 | 0.5 | 0.4 | 0.4 |
| BaO | 32.8 | 32.4 | 29.6 | 27.1 |
| $ZrO_2$ | 3.0 | 4.4 | 3.0 | 2.8 |
| $TiO_2$ | — | — | 2.0 | — |
| $Ta_2O_5$ | — | — | — | 2.0 |
| Exp. | 52.9 | 52.4 | 49.9 | 47.0 |
| S.P. | 941 | 952 | 949 | 991 |
| A.P. | 730 | 740 | 729 | 772 |
| St.P. | 679 | 690 | 675 | 718 |
| Dur. | 0.03 | 0.03 | 0.03 | 0.03 |
| M.Liq. | 1175 | 1240 | — | — |
| Liq. | — | — | — | — |

*Present as an impurity in the $BaCO_3$ batch material. Not added intentionally.

TABLE IA

| | 7059 | 1724 | 1733 | 1735 | 1 |
|---|---|---|---|---|---|
| $SiO_2$ | 63.4 | 62.8 | 65.0 | 66.0 | 71.1 |
| $Al_2O_3$ | 8.0 | 10.7 | 10.4 | 9.9 | 7.2 |
| $B_2O_3$ | 16.1 | 4.6 | 12.3 | 4.7 | 3.9 |
| MgO | — | 9.2 | 2.5 | — | — |
| CaO | — | 9.2 | 4.9 | 13.8 | — |
| SrO | — | — | 2.5 | — | — |
| BaO | 12.5 | 3.5 | 2.5 | 5.7 | 17.8 |

| | 2 | 3 | 4 | 5 | 6 |
|---|---|---|---|---|---|
| $SiO_2$ | 77.7 | 72.5 | 73.3 | 70.7 | 70.4 |
| $Al_2O_3$ | 8.3 | 7.4 | 7.8 | 7.2 | 7.1 |
| $B_2O_3$ | — | — | 3.8 | 3.8 | 3.8 |
| SrO | — | — | — | — | — |
| BaO | 14.0 | 18.1 | 13.2 | 17.7 | 17.6 |
| $ZrO_2$ | — | 2.0 | 1.9 | 0.5 | 1.0 |

| | 7 | 8 | 9 | 10 |
|---|---|---|---|---|
| $SiO_2$ | 69.7 | 69.0 | 69.7 | 69.7 |
| $Al_2O_3$ | 7.1 | 7.0 | 7.1 | 7.0 |
| $B_2O_3$ | 3.8 | 3.7 | 3.8 | 3.8 |
| BaO | 17.4 | 17.3 | 15.4 | 15.4 |
| $ZrO_2$ | 2.0 | 2.9 | 2.0 | 2.0 |
| $TiO_2$ | — | — | 2.0 | — |
| $Ta_2O_5$ | — | — | — | 2.0 |

An examination of the above glasses illustrates the care in composition control that must be exercised in preparing glasses satisfying the objectives of the present invention. For example, Code 7059 and Code 1733 demonstrate strain points which are too low and the chemical durabilities thereof are less than desired. Whereas the strain points and the chemical durabilities of Code 1724 and Code 1735 are satisfactory, their long term stability against devitrification has not proven satisfactory for use in the overflow downdraw sheet process.

Examples 1 and 5 demonstrate the very dramatic effect which the inclusion of $B_2O_3$ alone exerts on the strain point of the inventive glasses and yielding a low liquidus temperature, and the action of $ZrO_2$ to raise the strain point while leaving the liquidus temperature undisturbed. Example 2 illustrates that a high $SiO_2$ content raises the liquidus temperature to too high a value. Examples 3-10 are particularly interesting in demonstrating the substantial effects upon the properties of the inventive glasses exerted by $ZrO_2$, $TiO_2$, and $Ta_2O_5$. Thus, each addition significantly reduces the thermal expansion of the glass while not deleteriously affecting the strain point. Examples 7 and 8 illustrate the need to restrict the level of $ZrO_2$, however, in order to avoid a great increase in the liquidus temperature.

Example 10 comprises the most preferred composition based upon its overall combination of chemical, physical, and melting properties, and being ideally suited to be drawn into thin sheet employing the downdraw sheet processing technique.

We claim:

1. A glass exhibiting a strain point higher than 660° C., a liquidus temperature no higher than 1,175° C., a weight loss of less than 1 mg/cm² after immersion for 24 hours in an aqueous 5% by weight HCl solution at 95° C., and long term stability against devitrification at melting and forming temperatures, said glass being essentially free from alkali metal oxides and consisting essentially, expressed in terms of mole percent on the oxide basis, of

| | | | | | |
|---|---|---|---|---|---|
| $SiO_2$ | 65-76 | MgO | 0-5 | | |
| $Al_2O_3$ | 7-11 | CaO | 0-10 | $TiO_2$ | 0-3 |
| BaO | 12-19 | SrO | 0-10 | $Ta_2O_5$ | 0-3 |
| $B_2O_3$ | 0-5 | MgO + CaO + SrO | 0-15 | $TiO_2$ + $Ta_2O_5$ | 0.5-5. |

2. A glass according to claim 1 consisting essentially of

| | | | |
|---|---|---|---|
| $SiO_2$ | 68-76 | | |
| $Al_2O_3$ | 7-10 | $TiO_2$ | 0-2.5 |
| BaO | 14-19 | $Ta_2O_5$ | 0-2.5 |
| $B_2O_3$ | 0-5 | $TiO_2$ + $Ta_2O_5$ | 0.5-5. |

3. In a liquid crystal display device which employs polycrystalline silicon thin film transistors as switches, which device contains a flat, transparent glass substrate, the improvement wherein said glass exhibits a strain point higher than 660° C., a liquidus temperature no higher than 1,175° C., a weight loss of less than 1 mg/cm² after immersion for 24 hours in an aqueous 5% by weight HCl solution at 95° C., and long term stability against devitrification at melting and forming temperatures, said glass being essentially free from alkali metal oxides and consisting essentially, expressed in terms of mole percent on the oxide basis, of

| | | | | | |
|---|---|---|---|---|---|
| $SiO_2$ | 65-76 | MgO | 0-5 | | |
| $Al_2O_3$ | 7-11 | CaO | 0-10 | $TiO_2$ | 0-3 |
| BaO | 12-19 | SrO | 0-10 | $Ta_2O_5$ | 0-3 |
| $B_2O_3$ | 0-5 | MgO + CaO + SrO | 0-15 | $TiO_2$ + $Ta_2O_5$ | 0.5-5. |

4. In a liquid crystal display device according to claim 3 wherein said glass consists essentially of

| | |
|---|---|
| $SiO_2$ | 68-76 |

| -continued | | | |
|---|---|---|---|
| Al$_2$O$_3$ | 7-10 | TiO$_2$ | 0-2.5 |
| BaO | 14-19 | Ta$_2$O$_5$ | 0-2.5 |
| B$_2$O$_3$ | 0-5 | TiO$_2$ + Ta$_2$O$_5$ | 0.5-5. |

| | | | |
|---|---|---|---|
| SiO$_2$ | 68-76 | | |
| Al$_2$O$_3$ | 7-10 | TiO$_2$ | 0-2.5 |
| BaO | 14-19 | Ta$_2$O$_5$ | 0-2.5 |
| B$_2$O$_3$ | 0-5 | TiO$_2$ + Ta$_2$O$_5$ | 0.5-5. |

* * * * *